US008650885B2

(12) United States Patent
Reinhardt et al.

(10) Patent No.: US 8,650,885 B2

(45) Date of Patent: Feb. 18, 2014

(54) RETAINING MEMBER FOR USE WITH GAS TURBINE ENGINE SHAFT AND METHOD OF ASSEMBLY

(75) Inventors: Gregory E. Reinhardt, South Glastonbury, CT (US); Daniel Benjamin, Simsbury, CT (US); Brian C. Lund, Moodus, CT (US)

(73) Assignee: United Technologies Corporation, Hartford, CT (US)

(*) Notice: Subject to any disclaimer, the term of this patent is extended or adjusted under 35 U.S.C. 154(b) by 1092 days.

(21) Appl. No.: 12/644,480

(22) Filed: Dec. 22, 2009

(65) Prior Publication Data

US 2011/0146298 A1 Jun. 23, 2011

(51) Int. Cl.
*F02C 7/20* (2006.01)

(52) U.S. Cl.
USPC ... 60/796; 415/216.1; 416/244 R; 416/244 A; 416/198 A; 416/201 R

(58) Field of Classification Search
USPC .......... 60/796; 415/216.1; 416/244 R, 244 A, 416/198 A, 201 R
See application file for complete search history.

(56) References Cited

U.S. PATENT DOCUMENTS

| | | | | |
|---|---|---|---|---|
| 2,611,632 | A | 9/1952 | Harris | |
| 2,660,399 | A | 11/1953 | Robinson et al. | |
| 3,393,533 | A | 7/1968 | Wilinson | |
| 3,406,535 | A | 10/1968 | Suderow | |
| 3,602,535 | A | 8/1971 | Behning | |
| 3,631,688 | A | 1/1972 | Quick | |
| 3,722,058 | A | 3/1973 | Corsmeier | |
| 3,846,044 | A | 11/1974 | Shank | |
| 3,916,495 | A | 11/1975 | Klassen et al. | |
| 4,037,404 | A | 7/1977 | Bougain | |
| 4,456,425 | A | 6/1984 | McCarty et al. | |
| 4,468,148 | A | 8/1984 | Seymour | |
| 4,611,464 | A | 9/1986 | Hetzer et al. | |
| 4,685,286 | A | 8/1987 | Hetzer et al. | |
| 5,131,782 | A | 7/1992 | Bruno et al. | |
| 5,288,210 | A | 2/1994 | Albrecht et al. | |
| 5,537,814 | A * | 7/1996 | Nastuk et al. | 60/796 |
| 5,580,183 | A | 12/1996 | Brackoneski et al. | |
| 5,779,416 | A | 7/1998 | Sternitzky | |
| 6,250,878 | B1 * | 6/2001 | Wesling et al. | 415/115 |
| 7,596,949 | B2 | 10/2009 | DeVane et al. | |
| 2005/0013696 | A1 * | 1/2005 | Le Jeune et al. | 416/244 A |
| 2006/0216143 | A1 * | 9/2006 | Trinks et al. | 415/173.1 |
| 2009/0162136 | A1 | 6/2009 | Makin et al. | |
| 2010/0124495 | A1 * | 5/2010 | Bifulco | 415/216.1 |
| 2011/0052384 | A1 | 3/2011 | Shi et al. | |

OTHER PUBLICATIONS

Pratt & Whitney Canada, Illustrated Parts Catalog, Manual Part No. 3044954, "Compressor Rotor Balancing Assembly," 72-30-06, Figure 2, pp. 1-2, (REDACTED) (Oct. 19, 2007).

* cited by examiner

*Primary Examiner* — Gerald L Sung
*Assistant Examiner* — Craig Kim
(74) *Attorney, Agent, or Firm* — Kinney & Lange, P.A.

(57) ABSTRACT

A gas turbine engine assembly includes a rotor shaft having a threaded portion, a rotor stack support positioned radially outward from the rotor shaft, and a locking nut. The locking nut includes a body portion, a threaded portion located on a radially inner surface of the body portion, and a lug portion extending from the body portion. The rotor stack support radially rests upon the body portion of the locking nut, and the rotor stack support axially rests against the lug portion of the locking nut. The threaded portion of the locking nut and the threaded portion of the rotor shaft are engaged together.

20 Claims, 3 Drawing Sheets

RETAINING MEMBER FOR USE WITH GAS TURBINE ENGINE SHAFT AND METHOD OF ASSEMBLY

BACKGROUND

The present invention relates to retaining members, and more particularly to retaining members configured for use with shafts of gas turbine engines and associated assembly methods.

Machines such as gas turbine engines often include stacks of rotatable parts that must be held together during operation. Tie shafts and threaded retaining nuts are commonly used to hold together, and in some instances axially compress, rotor stacks in gas turbine engines. The operating envelope of a typical gas turbine engine can generate significant forces and temperatures, which can cause certain components to deform. Under such conditions the retaining nut can exhibit undesirable "lift-off", or may loosen or otherwise undesirably reduce its effectiveness in holding the rotor stack together. In particular, a forward portion of the retaining nut tends to exhibit lift-off.

Thus, the present invention provides an alternative retaining member suitable for use in a gas turbine engine, and an alternative method of assembly.

SUMMARY

A gas turbine engine assembly according to the present invention includes a rotor shaft having a threaded portion, a rotor stack support positioned radially outward from the rotor shaft, and a locking nut. The locking nut includes a body portion, a threaded portion located on a radially inner surface of the body portion, and a lug portion extending from the body portion. The rotor stack support radially rests upon the body portion of the locking nut, and the rotor stack support axially rests against the lug portion of the locking nut. The threaded portion of the locking nut and the threaded portion of the rotor shaft are engaged together.

DETAILED DESCRIPTION

In general, the present invention relates to a retaining member or locking nut, a gas turbine engine assembly having such a retaining member, and a method of assembly for a gas turbine engine. The retaining member is threadably engaged on a rotor shaft (or tie shaft). The retaining member axially abuts a support member, such as a frusto-conical stub shaft or other rotor stack support, and the support member radially rests on the retaining member to restrain and limit lift-off during engine operation. The retaining member and the support member can include cooperative castellations (i.e., teeth) and notches that are engaged to effectively lock the retaining member in place by reducing or eliminating rotation of the retaining member relative to the support member. During assembly, the rotor shaft can be stretched to create a rotor stack axial preload force on the support member for torque transmission and permit threading the retaining member on the rotor shaft, and the rotor shaft then released (i.e., unstretched) to apply the preload force to the rotor stack and to engage the castellations and notches. Additional features and benefits of the present invention will be recognized in view of the description that follows.

Figure 1:
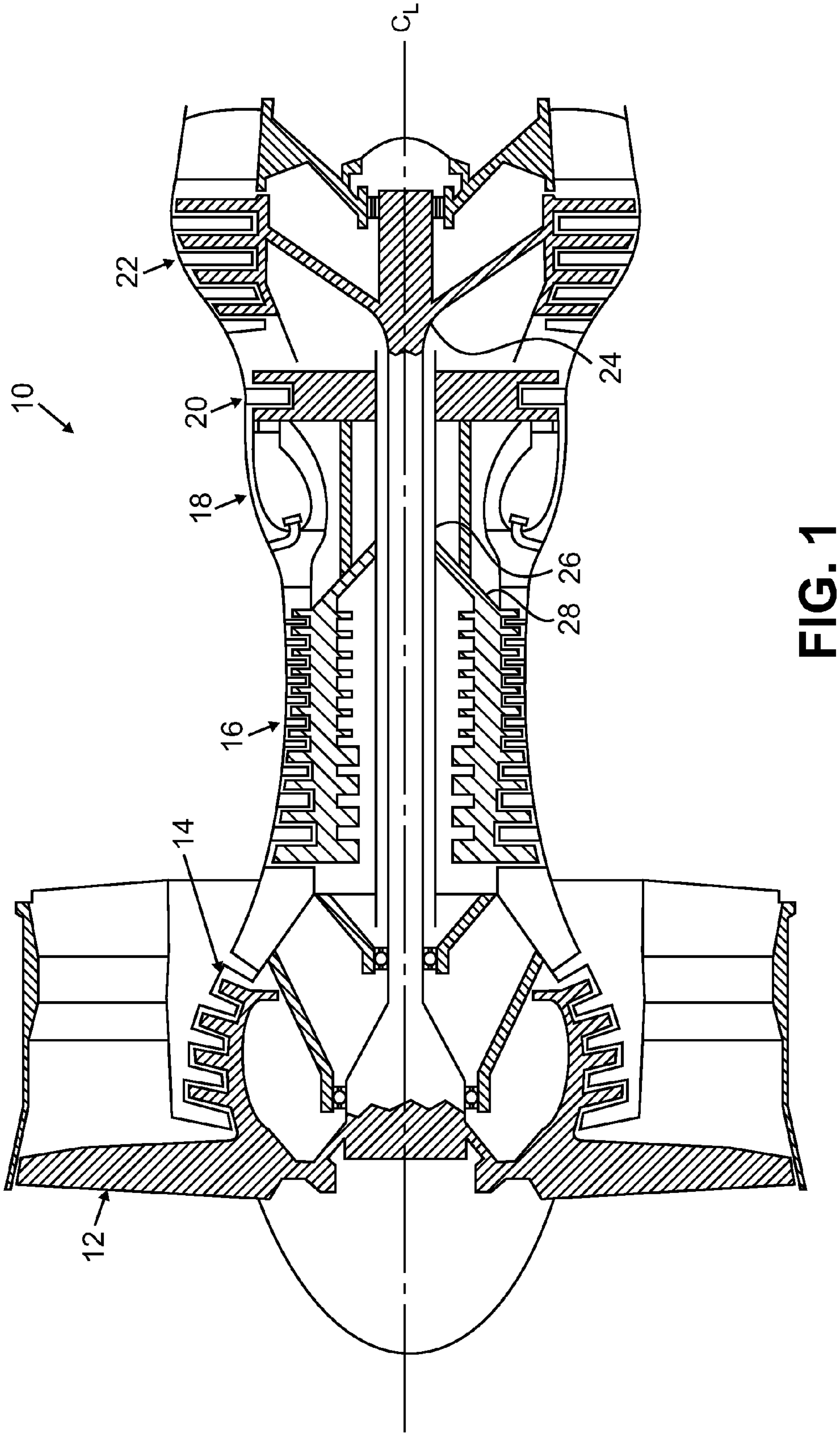
FIG. 1 is a cross-sectional view of a gas turbine engine.

FIG. 1 is a cross-sectional view of one embodiment of a gas turbine engine 10 that includes a fan 12, a low pressure compressor (LPC) 14, a high pressure compressor (HPC) 16, a combustor 18, a high pressure turbine (HPT) 20 and a low pressure turbine (LPT) 22. The fan 12 and the LPC 14 are connected to the LPT 22 by a shaft 24 to rotate together about an engine centerline $C_L$, and the HPC 16 and the HPT 20 are connected together by a shaft 26 to rotate together about the centerline $C_L$. Those of ordinary skill in the art will understand the basic components and operation of conventional gas turbine engines, and therefore further explanation here is unnecessary. It should be noted, however, that the engine 10 in FIG. 1 is shown merely by way of example and not limitation. The present invention is applicable to gas turbine engines of nearly any configuration, such as those with a turbofan configuration with gearing that allows the fan 12 to operate at a different speed from the LPC 14.

Figure 2:
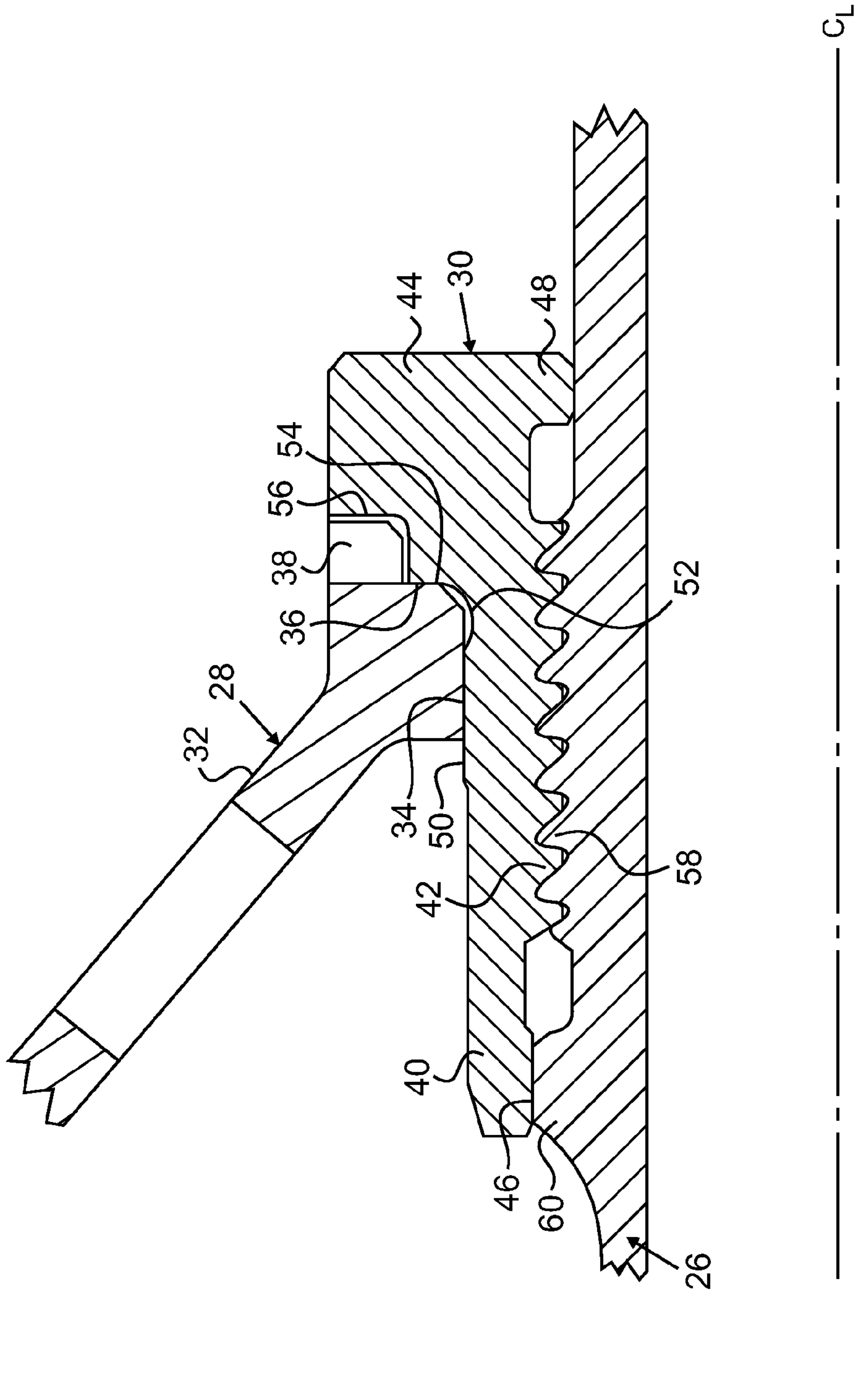
FIG. 2 is a cross-sectional view of a portion of the gas turbine engine, illustrating a retaining member and associated assembly according to the present invention.

FIG. 2 is a cross-sectional view of a portion of the gas turbine engine 10 (only a portion above the centerline $C_L$ is shown, for simplicity). As shown in FIG. 2, a rotor stack support 28 and a retaining member 30 are positioned relative to the shaft 26. In the illustrated embodiment, the rotor stack support 28 is configured as a stub shaft having a substantially frusto-conical portion 32 that defines a radially-facing surface 34, an aft, axially-facing surface 36 and a plurality of axially-facing castellations 38 (i.e., axially facing teeth). The castellations 38 are angularly spaced from one another. Any suitable number of the castellations 38 can be provided as desired for particular applications. The castellations 38 can be located radially outward from the surface 36, which can be substantially planar. In the illustrated embodiment, a radially inward edge of a distal end of each castellation 38 is chamfered. The surface 34 is adjacent to the surface 36. The surface 34 faces radially inward, and can be annularly shaped with a substantially planar face.

The retaining member 30 includes a substantially cylindrical body portion 40, a threaded portion 42, a lug portion 44, a forward pilot 46, an aft pilot 48, a land 50, and a stress relief groove 52. In the illustrated embodiment, one half of the retaining member 30 viewed in cross-section is generally L-shaped. The forward pilot 46 is located at a forward end of the body portion 40 and the aft pilot 48 is located at an opposite aft end of the body portion 40 such that the pilots 46 and 48 are axially spaced from each other. Pilots 46 and 48 both face radially inward, and can protrude slightly from the body portion 40. The threaded portion 42 is located at a radially inner surface of the body portion 40, and is axially arranged in between the pilots 46 and 48. The land 50 can extend in a substantially annular shape. The land 50 is positioned at a radially outer surface of the body portion 40, and can be axially aligned with the threaded portion 42. The lug portion 44 is located at or near the aft end of body portion 40, and extends generally radially outward. As shown in FIG. 2, the aft pilot 48 is generally axially aligned with the lug portion 44. A radially extending and substantially planar engagement surface 54 is defined on a forward face of the lug portion 44. A plurality of notches 56 are defined at the forward face of the lug portion 44, and the notches 56 can be located at a perimeter of the lug portion 44, generally radially outward from the engagement surface 54. The notches 56 are angularly spaced from each other, in a manner that generally corresponds to an arrangement of the castellations 38. The stress relief groove 52 is annular in shape and extends about the body portion 40 between the lug portion 44 and the land 50. In the illustrated embodiment, the stress relief groove 52 has a compound radius and is located directly adjacent to the forward face of the lug portion 44, which in effect forms a fillet adjacent to the engagement surface 54. The retaining member 30 can include additional features not specifically described, such as tooling engagement features to help rotate the retaining member 30 as desired.

The shaft 26 includes a threaded portion 58. The threaded portion 42 of the retaining member 30 is configured to engage the threaded portion 58 of the shaft 26. A land 60 is located forward of the threaded portion 58 and extends radially outward from the shaft 26. The forward pilot 46 of the retaining member 30 can fit about the land 60, and that fit can be line-on-line or slightly loose to help enable assembly while ensuring that the threaded portions 42 and 58 can be centered relative to each other. The aft pilot 48 of the retaining member 30 loosely rests on shaft 26 aft of the threaded portion 58. An additional land can optionally be provided where the aft pilot 48 rests upon the shaft 26. As shown in FIG. 2, the aft pilot 48 extends radially inward further than the threaded portion 42 of the retaining member 30, which allows the retaining member 30 to be threaded onto the shaft 26 without obstruction. The pilots 46 and 48 at opposite ends of the retaining member 30 help reduce lift-off of the retaining member 30 relative to the shaft 26 during operation of the engine 10, as well as helping to align the threaded portions 42 and 58 during assembly.

The surface 34 of the rotor stack support 28 rests against the retaining member 30 and can thereby contact and exert force upon the land 50 to restrain and limit displacement and deflection of the retaining member 30 relative to the shaft 26, which helps reduce lift-off of the retaining member 30. More particularly, the rotor stack support 28 can be axially positioned such that the surface 34 helps maintain engagement of the threaded portion 42 of the retaining member 30 with the threaded portion 58 of the shaft 26. As shown in the illustrated embodiment, the pilots 46 and 48 are axially spaced from the surface 34 at opposite sides of the land 50 so that distribution of the load on the retaining member 30 exerted by the rotor stack support 28 (after unstretching of the shaft 26) is pointed to help counteract the tendency for lift-off of the retaining member 30 during operation of the engine 10. A fit between the surface 34 of the rotor stack support 28 and the land 50 on the shaft 26 can be selected as a function of required operating conditions, and can be a relatively tight fit. As axial loading increases on the threaded portions 42 and 58, for higher torque driven gas turbine engines, the lift-off effect is greatly reduced on the first few threads of the threaded portions 42 and 58.

When the retaining member 30 is tightened and the shaft 26 is unstretched (as explained below), the engagement surface 54 on the lug portion 44 of the retaining member 30 abuts and axially presses against the surface 36 of the rotor stack support 28. This allows the retaining member 30 to provide a compressive force to the rotor stack support 28, which can help hold together a stack of components connected to the rotor stack support 28. For instance, the retaining member 30 can compress the rotor stack support 28 against components of the HPC 16, or other rotor stacks in the engine 10. While the engagement surface 54 and the surface 36 are in contact, the castellations 38 can be configured so as not to bottom out in the notches 56. In other words, the notches 56 can have an axial depth that is greater than an axial length of the castellations 38. Such a configuration causes loads on the rotor stack support 28 to be borne through the surface 36 rather than through the castellations 38. Furthermore, the axial length of the castellations 38 is generally proportional to a length of shaft stretch for the shaft 26 as the mating engagement of the castellations 38 with the notches 56 is related to shaft stretching, as will be explained further below. The castellations 38 help to prevent relative circumferential rotation, about the engine centerline $C_L$, between the retaining member 30 and the rotor stack support 28.

It should be noted that terms of orientation used herein like "forward" and "aft" are relative. In alternative embodiments those relative orientations can vary as desired for particular applications. Moreover, while the illustrated embodiment depicts the castellations 38 on the rotor stack support 28 and the notches 56 on the retaining member 30, in alternative embodiments the locations of those features on the rotor stack support 28 and the retaining member 30 can be reversed or otherwise relocated.

Figure 3:
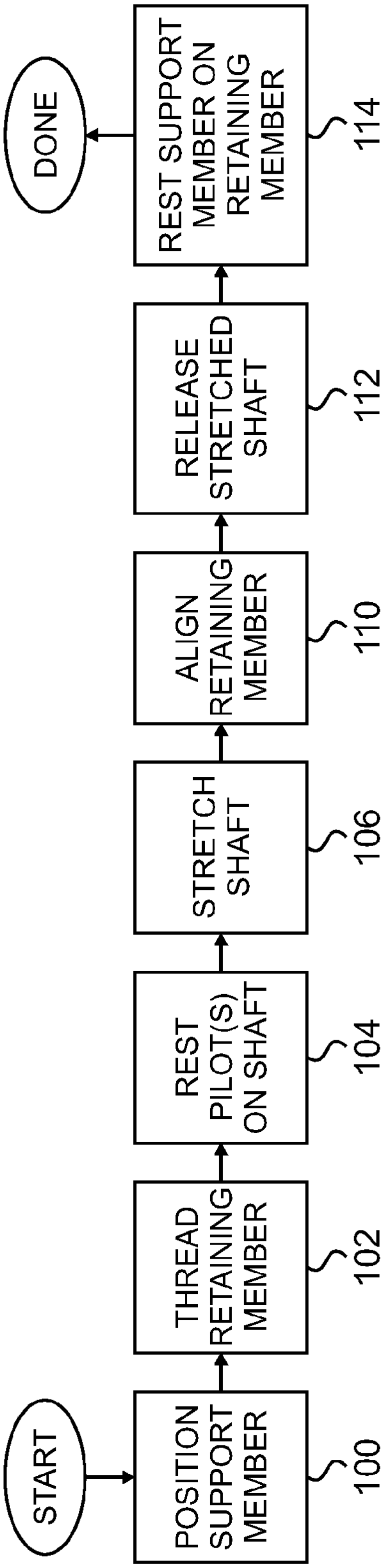
FIG. 3 is a flow chart of an assembly method according to the present invention.

FIG. 3 is a flow chart of an assembly method for a gas turbine engine. First, a rotor stack is positioned. The rotor stack support 28 is positioned relative to the rotor stack (step 100). The retaining member 30 is threadably engaged onto the shaft 26 (step 102). Differential thermals, such as induction heating of the female part and/or forced cooling of the male part, may be used to engage the retaining member 30 with the rotor stack support 28. The shaft 26 can be inserted into the rotor stack radially inward from and substantially coaxial with the rotor stack support 28 either prior to or after Step 102. Furthermore, the pilots 46 and 48 of the retaining member 30 are rested on the shaft 26 (step 104). The shaft 26 is then axially stretched (step 106). Typically the shaft 26 is stretched from an aft end thereof, using suitable equipment, while a forward end thereof is fixed. This stretching elongates the shaft 26, and repositions the threaded portion 58 of the shaft 26 relative to the frusto-conical portion 32 of the rotor stack support 28, for instance. The retaining member 30 can then be rotated such that the castellations 38 align with the notches 56 (step 110). This rotation can involve tightening or loosening the retaining member 30 as appropriate, though in some instances the retaining member 30 may not require any special rotation for alignment. After the castellations 38 and the notches 56 are aligned, the shaft 26 is released from the axially stretched condition (i.e., unstretched) such that the castellations 38 extend at least partially into the notches 56 to restrict rotation of the retaining member 30 relative to the rotor stack support 28, and in turn, relative to the shaft 26 (step 112). After the shaft 26 is released from the axially stretched condition, the surface 34 of the rotor stack support 28 can be axially aligned with the threaded portion 42 of the retaining member 30 It should be noted that the surface 34 may axially align with the threaded portion 42 before stretching the shaft 26 as well, through the pilots 46 and 48 will shift axially relative to the shaft 26 as the shaft 26 is being stretched and unstretched. The retaining member 30 is typically engaged with the shaft 26 such that releasing the shaft 26 from the stretched condition will impart compressive loading to the rotor stack support 28 transmitted to the rotor stack, though it should be recognized that the magnitude of compressive loading will vary across an operational envelope of the engine 10. The radially-facing surface 34 of the rotor stack support 28 is rested on the land 50 or another radially outer surface of the retaining member 30 in a configuration that restrains lift-off of the retaining member 30 relative to the shaft 26, and the axially-facing surface 36 of the rotor stack support 28 and the axially-facing engagement surface 54 on the lug portion 44 of the retaining member 30 are rested against one another (step 114). Step 114 provides the resultant arrangement, though aspects of that step are typically initiated before stretching the shaft 26 at Step 106. It should be recognized that additional steps not specifically discussed can be performed in conjunction with the present assembly method. Moreover, the particular order of the step described above can vary in further embodiments. In addition, disassembly can be accomplished by re-stretching the shaft 26 and loosening the retaining member 30.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, the retaining member or locking nut of the present invention can be utilized in a variety of locations within a gas turbine engine, such as adjacent to an HPT stack, as well as with a variety of other machines and apparatuses.

The invention claimed is:

1. A gas turbine engine assembly comprising:

a rotor shaft having a threaded portion;

a rotor stack support positioned radially outward from the rotor shaft; and a locking nut comprising:

a body portion, wherein the rotor stack support radially rests upon the body portion of the locking nut;

a threaded portion located on a radially inner surface of the body portion, wherein the threaded portion of the locking nut and the threaded portion of the rotor shaft are engaged together; and a lug portion extending from the body portion, wherein the rotor stack support axially rests against the lug portion of the locking nut.

2. The assembly of claim 1 and further comprising:

axially-facing castellations located on one of the lug portion of the locking nut and the rotor stack support, and a plurality of angularly spaced and axially-facing engagement notches located on the other of the lug portion of the locking nut and the rotor stack support, wherein the castellations extend at least partially into the notches to limit relative rotation between the rotor stack support and the locking nut.

3. The assembly of claim 1, the locking nut further comprising:

a forward pilot located at or near a first end of the body portion; and an aft pilot located at or near a second end of the body portion opposite the first end, wherein the rotor stack support is configured to rest on the body portion of the locking nut in between the forward pilot and the aft pilot.

4. The assembly of claim 1, wherein the engagement notches are located at a radially outward perimeter of the lug portion.

5. The assembly of claim 1, the locking nut further comprising:

a land extending from a radially outward surface of the body portion, wherein the rotor stack support contacts the land.

6. The assembly of claim 5, wherein the land is axially aligned with the threaded portion of the locking nut.

7. The assembly of claim 1, the locking nut further comprising:

an annular stress relief groove in the body portion located directly adjacent to a forward face of the lug portion.

8. A method of assembling a gas turbine engine, the method comprising:

positioning a support member radially outward from and substantially coaxial with a shaft;

threadably engaging a locking nut onto the shaft;

axially stretching the shaft;

rotating the locking nut such that axially-facing castellations on one of the locking nut and the support member align with axially-facing notches in the other of the locking nut and the support member;

resting the support member on a radially outer surface of the locking nut in a configuration that restrains lift-off of the locking nut relative to the shaft; and releasing the shaft from the axially stretched condition such that the castellations extend at least partially into the notches to restrict rotation of the locking nut.

9. The method of claim 8, wherein the step of releasing the shaft from the axially stretched condition causes the support member to axially align with a threaded portion of the locking nut.

10. The method of claim 8 and further comprising:

resting an axially-facing surface of the support member and an axially-facing surface of the locking nut against one another.

11. The method of claim 8 and further comprising:

resting a first pilot of the locking nut on the shaft; and resting a second pilot of the locking nut on the shaft, wherein the support member rests on the body portion of the locking nut in between the forward pilot and the aft pilot.

12. A retaining member for use with a gas turbine engine, the retaining member comprising:

a substantially cylindrical body portion;

a forward pilot located at or near a first end of the substantially cylindrical body portion;

an aft pilot located at or near a second end of the substantially cylindrical body portion opposite the first end;

a threaded portion located on a radially inner surface of the substantially cylindrical body portion between the forward pilot and the aft pilot; and a lug portion extending in a generally radial direction from the substantially cylindrical body portion, wherein the lug portion defines a plurality of angularly spaced and axially-facing engagement notches, and wherein the engagement notches face toward the forward pilot.

13. The retaining member of claim 12, wherein the lug portion defines a radially extending and substantially planar engagement surface located radially inward from the engagement notches.

14. The retaining member of claim 12, wherein the engagement notches are located at a radially outward perimeter of the lug portion.

15. The retaining member of claim 12 and further comprising:

a land extending from a radially outward surface of the substantially cylindrical body portion.

16. The retaining member of claim 15, wherein the land is axially aligned with the threaded portion.

17. The retaining member of claim 15 and further comprising:

an annular stress relief groove located on the substantially cylindrical body portion between the land and the lug portion.

18. The retaining member of claim 12 and further comprising:

an annular stress relief groove in the substantially cylindrical body portion located directly adjacent to a forward face of the lug portion.

19. The retaining member of claim 18, wherein the annular stress relief groove defines a compound radius fillet.

20. The retaining member of claim 12, wherein the aft pilot extends further radially inward than the threaded portion.

* * * * *